(12) United States Patent
Nishikawa et al.

(10) Patent No.: US 6,839,512 B1
(45) Date of Patent: Jan. 4, 2005

(54) CAMERA DEVICE HAVING POSTERIOR FILTER

(75) Inventors: Katsuhiko Nishikawa, Saitama (JP); Takashi Itohiya, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 0 days.

(21) Appl. No.: 10/740,592

(22) Filed: Dec. 22, 2003

(30) Foreign Application Priority Data

Jul. 17, 2003 (JP) .......................................... 2003-198462

(51) Int. Cl.$^7$ ........................... G03B 3/00; G03B 11/00; H04N 5/225; G02B 7/02
(52) U.S. Cl. ....................... 396/144; 396/544; 348/342; 348/345; 359/823
(58) Field of Search .......................... 396/89, 144, 544; 348/340, 342, 360, 361, 345; 359/823

(56) References Cited

U.S. PATENT DOCUMENTS 4,862,199 A * 8/1989 Centkowski et al. .......... 396/19
6,157,781 A * 12/2000 Konno et al. .................. 396/71

FOREIGN PATENT DOCUMENTS

JP  2001255444 A  9/2001  ............ G02B/7/02
JP  2002350701 A  12/2002  ............ G02B/7/02

* cited by examiner

Primary Examiner—W. B. Perkey
(74) Attorney, Agent, or Firm—Jacobson Holman

(57) ABSTRACT

The present invention is directed to a camera device having a posterior filter which is of compact design and facilitates attachment and detachment of optical elements such as a posterior filter. The camera device comprises a fixed lens barrel having its inner surface formed with a first helicoidal member, an active focusing barrel, for manual adjustment, rotatably disposed about an optical axis over an outer surface of the fixed lens barrel, a revolving barrel rotatably disposed about the optical axis over an inner surface of the fixed lens barrel and having its outer surface formed with a second helicoidal member, the second helicoidal member being cooperatively mated with the first helicoidal member, a coupling element communicating rotary motion of the active focusing barrel to the revolving barrel without conveying linear motion along the optical axis, a holder of a trailing lens(es) fixed to the revolving barrel in unit, a posterior filter holder receiving the linear motion along the optical axis from either the revolving barrel or the trailing lens holder but not the rotary motion from the same and detachably holding the posterior filter, and a rotary motion restriction member built in the fixed lens barrel for impeding the rotary motion of the trailing lens holder.

5 Claims, 1 Drawing Sheet

CAMERA DEVICE HAVING POSTERIOR FILTER

BACKGROUND OF THE INVENTION

1. Field of the Invention

The present invention relates to a camera device having a posterior filter, and more particularly, to a camera device which has a posterior filter residing in a lens mount or its vicinity.

2. Prior Art

A camera device, which is sometimes used along with a sharp-cut filter, a neutral density (ND) filter, a color conversion filer, a color correction filter, an infrared cutoff filter for a CCD, or the like, is loaded with a filter ahead of an objective lens, or closer to an object, and this configuration of the camera device is advantageous in that the filter can be more easily attached to and detached from the camera device while it is accordingly unavoidable that the filter is considerably greater in diameter, and with a wide-angle lens having an almost 180-degree angular field, a frame of the filter is caught in a range of the angular field.

In order to overcome the above-mentioned disadvantages, usually an improved lens assembly used along with a posterior filter has been employed which is loaded with the filter in a location in or around a mount of a wide-angle lens. Such a detachable posterior filter incorporated lens assembly for a camera device is dedicated to a zoom lens and is comprised of a lens barrel, imaging optics therein, an imaging means located behind the imaging optics, and a displacement means for moving optical elements such as an optical filter along an optical path between the imaging optics and the imaging means (e.g., see Patent Document 1 as identified with Japanese Patent No. 2001-255444).

Another prior art embodiment is a camera lens assembly which is comprised of a lens barrel having a base plate at its bottom portion, a lens holder disposed in an optical axis within the lens barrel to retain groups of lenses, a fixed aperture stop, a fastening ring, and an infrared cutoff filter in positions and having cam pins in its outer circumferential surface, and an active focusing barrel, for manual adjustment, which is attached to the lens barrel and is provided with cam grooves respectively mated with the cam pins of the lens holder, and the active focusing barrel, while being revolved, permits the follower lens holder to linearly move along the optical axis by means of a cam mechanism consisting of the cooperative cam pins and cam grooves without rotary motion, thereby obtaining an image without angular and other deviations (e.g., see Patent Document 2 identified with Japanese Patent No. 2002-350701).

The cited embodiment as disclosed in Patent Document 1 facilitates attachment and detachment of the infrared cutoff filter through a simple manipulation. However, the infrared cutoff filter resides in a static portion of the lens barrel, and hence, forward movement of the imaging optics for the focusing results in the imaging optics having its most posterior plane spaced far from the infrared cutoff filter.

In such a situation, especially, when an imaging lens is a wide-angle lens, light flux exiting the most posterior plane of the imaging optics diverges at a great angle, and the infrared cutoff filter must have a diameter sufficiently large to avoid shading caused by itself. As a consequence, the displacement means of the optical elements should accordingly be large enough, and this is why the downsizing of the detachable posterior filter incorporated camera device is hard to attain.

The additional cited embodiment as disclosed in Patent Document 2 has its active focusing barrel revolved to activate the cam mechanism of the cam pins and cam grooves and let the follower lens holder linearly move along he optical axis together with the groups of lenses, the fixed aperture stop, the fastening ring, and the infrared cutoff filter retained by the lens holder without rotations of those retained components, thereby effectively avoiding the angular and other deviations of an image.

To keep all the components retained by the lens holder unrevolved, however, the linear movement of the lens holder along the optical axis should rely only on the cam mechanism of the cam pins and cam grooves mated with one another. This unavoidably causes the lens barrel to get bulky because several cam barrel members should telescopically overlap one another to let the groups of lenses move in various manners and directions relative to the optical axis, especially as in the case of the zoom lens assembly.

The camera device set forth in Patent Document 2 may be modified by providing a helicoidal portion in the fixed barrel(s) and the lens holder, respectively, to avoid using additional components for the barrel assembly. In this way, the barrel assembly can avoid getting bulky while enabling the groups of lenses to move differently relative to the optical axis, but instead, the lens holder and the components retained by the same are forced to revolve. Then, although a revision of the infrared filter permits the loading and unloading of the same in a direction perpendicular to the optical axis to ensure attachment of the infrared cutoff filter despite a simplified device design, the revolved lens holder causes an angular displacement of the direction of the attachment, which will be a cause of a difficulty in loading and unloading the infrared cutoff filter, and will also be prone to impede the loading and unloading of the same because of elements such as a signal propagation bump located in the posterior of the camera lens assembly.

The present invention is made to present a solution to the aforementioned problems in the prior art camera lens technology, and accordingly, it is an object of the present invention to provide a camera device having a posterior filter which is of a compact design without a cam barrel(s) and is capable of loading and unloading optical elements such as the posterior filter in a simplified manipulation by virtue of a fixed orientation of a filter holder.

SUMMARY OF THE INVENTION

In an aspect of the present invention, a camera device having a posterior filter A camera device having a posterior filter comprises a fixed lens barrel having its inner surface formed with a first helicoidal member, an active focusing barrel, for manual adjustment, rotatably disposed about an optical axis over an outer surface of the fixed lens barrel, a revolving barrel rotatably disposed about the optical axis over an inner surface of the fixed lens barrel and having its outer surface formed with a second helicoidal member, the second helicoidal member being cooperatively mated with the first helicoidal member, a coupling element communicating rotary motion of the active focusing barrel to the revolving barrel without conveying linear motion along the optical axis, a holder of a trailing lens(es) fixed to the revolving barrel in unit, a posterior filter holder receiving the linear motion along the optical axis from either the revolving barrel or the trailing lens holder but not the rotary motion from the same and detachably holding the posterior filter, and a rotary motion restriction member built in the fixed lens barrel for impeding the rotary motion of the trailing lens holder.

In another aspect of the present invention, a camera device having a posterior filter comprises a fixed lens barrel having its inner surface formed with a first helicoidal member, an active focusing barrel, for manual adjustment, rotatably disposed about an optical axis over an outer surface of the fixed lens barrel, a revolving barrel rotatably disposed about the optical axis over an inner surface of the fixed lens barrel and having its outer surface formed with a second helicoidal member, the second helicoidal member being cooperatively mated with the first helicoidal member, a coupling element communicating rotary motion of the active focusing barrel to the revolving barrel without conveying linear motion along the optical axis, a holder of a trailing lens(es) fixed to the revolving barrel in unit, a posterior filter holder receiving the linear motion along the optical axis from either the revolving barrel or the trailing lens holder but not the rotary motion from the same and detachably holding the posterior filter, a rotary motion restriction member built in the fixed lens barrel for impeding the rotary motion of the trailing lens holder, and a camera housing having an opening defined therein for a replacement of the posterior filter.

In still another aspect of the present invention, a wide-angle lens assembly having a posterior filter comprises a fixed lens barrel having its inner surface formed with a first helicoidal member, an active focusing barrel, for manual adjustment, rotatably disposed about an optical axis over an outer surface of the fixed lens barrel, a revolving barrel rotatably disposed about the optical axis over an inner surface of the fixed lens barrel and having its outer surface formed with a second helicoidal member, the second helicoidal member being cooperatively mated with the first helicoidal member, a coupling element communicating rotary motion of the active focusing barrel to the revolving barrel without conveying linear motion along the optical axis, a holder of a trailing lens(es) fixed to the revolving barrel in unit, a posterior filter holder receiving the linear motion along the optical axis from either the revolving barrel or the trailing lens holder but not the rotary motion from the same and detachably holding the posterior filter, and a rotary motion restriction member built in the fixed lens barrel for impeding the rotary motion of the trailing lens holder.

In further another aspect of the present invention, the revolving barrel has its inner surface formed with a third helicoidal member, and the camera device further comprises a follower barrel disposed linearly movable along the optical axis inside the revolving barrel but with restriction by the fixed lens barrel not to rotate, the follower barrel holding a lens(es) other than the trailing lens(es) and having its outer surface formed with a fourth helicoidal member, the third helicoidal member being cooperatively mated with the third helicoidal member.

Figure 1:
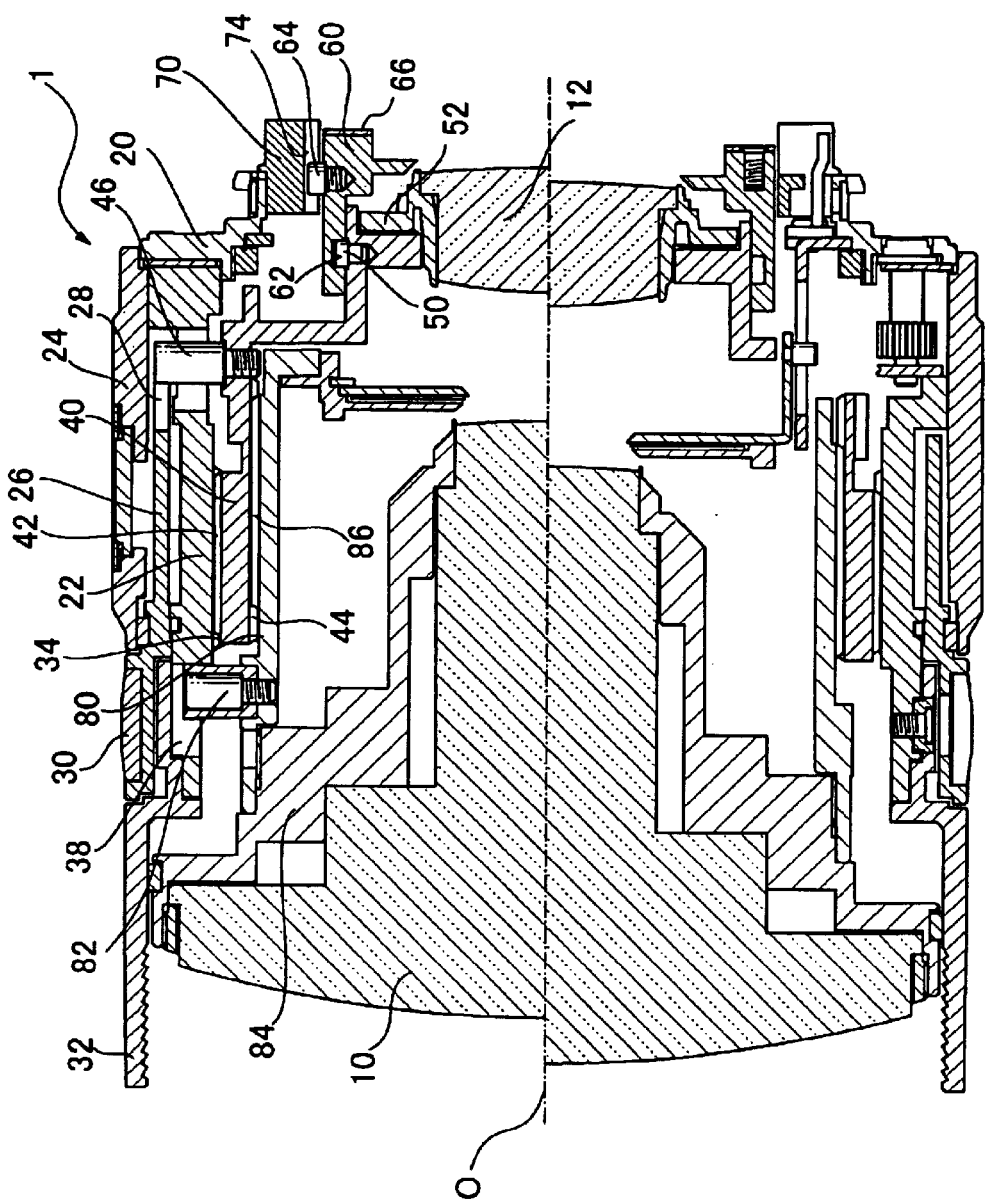
FIG. 1 is a sectional view showing a first embodiment of a wide-angle lens having a posterior filter according to the present invention.

BEST MODE OF THE INVENTION
(Embodiment 1)

A wide-angle lens assembly 1 having a posterior filter of a first preferred embodiment according to the present invention is, as shown in FIG. 1, incorporated with a short focus lens which are optics of a fore group of lenses 10 and a back group of lenses 12 that are respectively moved in various manners relative to an optical axis O for focusing.

A lens barrel of the detachable posterior filter incorporated wide-angle lens assembly 1 is comprised of inner and outer fixed barrels 22 and 24, and the former barrel is a fixed lens barrel integrated with a mount 20 used to attach the lens assembly to a camera body (not shown) while the latter barrel is a fixed lens barrel also integrated with the mount 20 and located in the outermost position of all components of the lens barrel. The lens barrel also includes an active focusing barrel 26 which is rotatably disposed between the inner and outer fixed barrels 22 and 24 for manual adjustment in focusing and which is provided with an active flexible ring 30 in a light exposing section at the front end of a barrel extension also for the manual adjustment in focusing. Right behind the focusing barrel 26, a linear groove 28 extends along the optical axis to aid linear movement of a component. Right ahead of the inner fixed barrel 22, a linear groove 38 extends along the optical axis to aid linear movement of another component, and a hood 32 is attached to the front end of the inner fixed barrel. The inner fixed barrel 22 has its inner surface formed with a first helicoidal member 34.

Inside the inner fixed barrel 22, a passive revolving barrel or a first follower focusing barrel 40 is located The first focusing barrel 40 has its outer surface formed with a second helicoidal member 42 that is cooperatively mated with the first helicoidal member 34 and has its inner surface formed with a third helicoidal member 44. A slidable pin 46 is planted in a trailing portion of the first focusing barrel 40 to serve as an outwardly extended link fitted in the linear groove 28. In further rear portion of the first focusing barrel 40, a fixture pin 50 supporting a posterior filter holder is located, and still further behind the same, a back lens holder 52 is attached to hold the back group of lenses.

In an outer surface of the rearmost portion of the first follower focusing barrel 40, a posterior filter holder 60 is rotatably mounted to serve as a frame that receives and holds the posterior filter (not shown) inserted in a direction orthogonal to the optical axis O. The posterior filter holder 60 has its inner surface formed with a circumferentially curved groove 62 which the fixture pin 50 is slidably fitted in while being tightly attached to the posterior filter holder, and also, the posterior filter holder 60 is planted with a linearly slidable guide pin 64 in its outer surface and provided with a posterior filter rest 66 at the rearmost end.

A protection ring 70 is attached to an inner surface of the mount 20. A linear groove 74, which the guide pin 64 is slidably fitted in, extends along the optical axis in an inner surface of the protection ring 70. The guide pin 64 and the linear groove 74 cooperatively serve as a rotary motion restricting portion.

A second follower focusing barrel 80 is disposed over an inner surface of the first follower focusing barrel 40. The second focusing barrel 80 has its outer surface formed with a fourth helicoidal member 86 and is planted with a linearly slidable guide pin 82 in its fore section, which is slidably fitted in the linear groove 38. At the front end of the focusing barrel 80, a fore lens holder 84 is attached to hold the fore group of lenses.

The detachable posterior filter incorporated wide-angle lens 1 configured as mentioned above particularly functions in a manner as follows. Turning the active flexible ring 30, the first follower focusing barrel 40 is rotated through the movement of the slidable pin 46 fitted in the linear groove 28. As a consequence, the engagement of the first helicoidal member 34 with the second helicoidal member 42 permits the first follower focusing barrel 40 to move along the optical axis with concurrent rotary motion, and thus, the back group of lenses 12 also follow the barrel along the optical axis while rotating. The movement of the first follower focusing barrel 40 along the optical axis is conveyed to the posterior filter holder 60 through the fixture pin 50 fitted in the circumferentially curved groove 62. The rotary motion of the posterior filter holder 60 is restricted by the engagement of the linear groove 74 and the slidable guide pin 64. Thus, the posterior filter holder 60 always provides a fixed orientation so as not to vary an angular direction in which the posterior filter is inserted therein.

The movement of the first follower focusing barrel 40 along the optical axis and the engagement of the third and fourth helicoidal members 44 and 86 enable the second follower focusing barrel 80 to move along the optical axis. Rotary movement of the second follower focusing barrel 80 is restricted by the engagement of the linear groove 38 and the sidable guide pin 82. Thus, the fore group of lenses 10 only move along the optical axis without rotating.

(Embodiment 2)

Another embodiment of the detachable posterior filter incorporated camera device according to the present invention is an imaging device having its objective lens fixed therein, and the loading and unloading of the posterior filter should be carried out independent of the objective lens configured in the same manner as in the aforementioned embodiment even after the detachment thereof. For that purpose, in a cabinet of the camera device, there is an opening through which the posterior filter is exchanged, and the posterior filter is inserted in and removed out of the opening to attach it to a posterior filter rest of a fixed orientation.

In accordance with the present invention, provided is a camera device having a posterior filter of which improved features are that a cam barrel is omitted to attain a more compact assembly and that a filter holder is always retained at a fixed orientation to effectively facilitate attachment and detachment of optical elements such as the posterior filter.

What is claimed is:

1. A camera device having a posterior filter, comprising
a fixed lens barrel having its inner surface formed with a first helicoidal member,
an active focusing barrel, for manual adjustment, rotatably disposed about an optical axis over an outer surface of the fixed lens barrel,
a revolving barrel rotatably disposed about the optical axis over an inner surface of the fixed lens barrel and having its outer surface formed with a second helicoidal member, the second helicoidal member being cooperatively mated with the first helicoidal member,
a coupling element communicating rotary motion of the active focusing barrel to the revolving barrel without conveying linear motion along the optical axis,
a holder of a trailing lens(es) fixed to the revolving barrel in unit,
a posterior filter holder receiving the linear motion along the optical axis from either the revolving barrel or the trailing lens holder but not the rotary motion from the same and detachably holding the posterior filter, and
a rotary motion restriction member built in the fixed lens barrel for impeding the rotary motion of the trailing lens holder.

2. A camera device according to claim 1, wherein the revolving barrel has its inner surface formed with a third helicoidal member, and the camera device further comprises a follower barrel disposed linearly movable along the optical axis inside the revolving barrel but with restriction by the fixed lens barrel not to rotate, the follower barrel holding a lens(es) other than the trailing lens(es) and having its outer surface formed with a fourth helicoidal member, the third helicoidal member being cooperatively mated with the third helicoidal member.

3. A camera device having a posterior filter, comprising
a fixed lens barrel having its inner surface formed with a first helicoidal member,
an active focusing barrel, for manual adjustment, rotatably disposed about an optical axis over an outer surface of the fixed lens barrel,
a revolving barrel rotatably disposed about the optical axis over an inner surface of the fixed lens barrel and having its outer surface formed with a second helicoidal member, the second helicoidal member being cooperatively mated with the first helicoidal member,
a coupling element communicating rotary motion of the active focusing barrel to the revolving barrel without conveying linear motion along the optical axis,
a holder of a trailing lens(es) fixed to the revolving barrel in unit,
a posterior filter holder receiving the linear motion along the optical axis from either the revolving barrel or the trailing lens holder but not the rotary motion from the same and detachably holding the posterior filter,
a rotary motion restriction member built in the fixed lens barrel for impeding the rotary motion of the trailing lens holder, and
a camera housing having an opening defined therein for a replacement of the posterior filter.

4. A wide-angle lens assembly having a posterior filter, comprising
a fixed lens barrel having its inner surface formed with a first helicoidal member,
an active focusing barrel, for manual adjustment, rotatably disposed about an optical axis over an outer surface of the fixed lens barrel,
a revolving barrel rotatably disposed about the optical axis over an inner surface of the fixed lens barrel and having its outer surface formed with a second helicoidal member, the second helicoidal member being cooperatively mated with the first helicoidal member,
a coupling element communicating rotary motion of the active focusing barrel to the revolving barrel without conveying linear motion along the optical axis,
a holder of a trailing lens(es) fixed to the revolving barrel in unit,
a posterior filter holder receiving the linear motion along the optical axis from either the revolving barrel or the trailing lens holder but not the rotary motion from the same and detachably holding the posterior filter, and
a rotary motion restriction member built in the fixed lens barrel for impeding the rotary motion of the trailing lens holder.

5. A wide-angle lens assembly according to claim 4, wherein the revolving barrel has its inner surface formed with a third helicoidal member, and the camera device further comprises a follower barrel disposed linearly movable along the optical axis inside the revolving barrel but with restriction by the fixed lens barrel not to rotate, the follower barrel holding a lens(es) other than the trailing lens(es) and having its outer surface formed with a fourth helicoidal member, the third helicoidal member being cooperatively mated with the third helicoidal member.

* * * * *